(12) United States Patent
Haber et al.

(10) Patent No.: US 7,784,040 B2
(45) Date of Patent: Aug. 24, 2010

(54) PROFILING OF PERFORMANCE BEHAVIOUR OF EXECUTED LOOPS

(75) Inventors: Gad Haber, Nesher (IL); Marcel Zalmanovici, Kiryat Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 1136 days.

(21) Appl. No.: 11/274,537

(22) Filed: Nov. 15, 2005

(65) Prior Publication Data

US 2007/0168999 A1    Jul. 19, 2007

(51) Int. Cl.
G06F 9/44 (2006.01)
G06F 9/45 (2006.01)

(52) U.S. Cl. .............. 717/151; 717/130; 717/131; 717/150; 717/154

(58) Field of Classification Search .......... None
See application file for complete search history.

(56) References Cited

U.S. PATENT DOCUMENTS

| | | | | |
|---|---|---|---|---|
| 6,327,699 B1* | 12/2001 | Larus et al. | ......... | 717/128 |
| 6,341,371 B1* | 1/2002 | Tandri | ......... | 717/158 |
| 6,351,844 B1* | 2/2002 | Bala | ......... | 717/128 |
| 2002/0129339 A1 | 9/2002 | Callahan et al. | | |
| 2003/0018446 A1 | 1/2003 | Makowski et al. | | |
| 2005/0086652 A1 | 4/2005 | Tian et al. | | |

\* cited by examiner

*Primary Examiner*—Chuck O Kendall

(57) ABSTRACT

A method and system for profiling performance behaviour of executed loops. For each invocation of a loop, a count of a measured event is incremented. A display is provided for a loop (209) showing the number of measured events for each of the loop's invocations. The code of a loop is instrumented (204) to obtain the count of loop invocations (207) and the occurrences of the measured event (208).

18 Claims, 7 Drawing Sheets

PROFILING OF PERFORMANCE BEHAVIOUR OF EXECUTED LOOPS

FIELD OF THE INVENTION

This invention relates to the field of performance analysis of computer programs. In particular, the invention relates to providing profiling of performance behaviour of executed loops.

BACKGROUND OF THE INVENTION

Performance analysis tools are the key contributors in identifying and resolving performance issues in complex architectures. Performance analysis tools are extensively used by different communities, including: hardware architects, compiler and performance tool developers, application and system writers.

In order for a performance tool to serve as a useful analysis utility, it must provide a convenient interface with the user. The interface may include graphic display, advanced search options, and interactive interface modes such as various statistical views, interactive call graphs, colourful views to help users identify bottlenecks, etc.

A performance analysis tool is applied to a program file to collect information on the behaviour of the program while it is run on a typical workload. The program may be, for example, an application program, a system program, hardware driver, etc A program may contain a loop. A loop is a sequence of statements which is specified once but which may be carried out several times in succession. The code inside the loop (referred to as the body of the loop) is obeyed a specified number of times, once for each of a collection of items, or until some condition is met.

Providing an indication of a potential area of performance improvement in the code of the program can enable programmers to tune the performance of their applications. The behaviour of executed loops for each time the loop was invoked, is an important area of performance improvement.

A known method for analysing loops' behaviour at run-time is based on collecting a complete tracing of the loop.

Tracing utilities provide complete information about each executed instruction. For example, a loop containing a conditional jump instruction which was executed 100 times, will produce a tracing list comprised of consecutive 100 jump instructions. Trace information is, therefore, very large, non-scalable and requires a post-processing phase in order to produce the appropriate statistics about the program's behaviour.

As opposed to tracing utilities, profiling tools do not generate such large amount of information but rather attach a value next to each executed instruction, representing the number of times it was executed or the amount of time it took to complete. Following the above example, profiling tools will produce a single jump instruction accompanied by the number 100, representing the number of times it was executed, or by the number of cycles/tics it required in order to complete.

Another method for analysing run-time behaviour uses debuggers to try and analyse the loops' behaviour while executing the program on a step-by-step manner. Debugging tools enable the developer to run a given program in order to interactively learn about its behaviour at run-time. This method is done manually by the programmer and, therefore, not suitable for collecting global information on the program behaviour, making it hard, for example, to gather frequency statistics on executed instructions or loops.

SUMMARY OF THE INVENTION

It is an aim of the present invention to provide a performance tool that includes a display of the behaviour of executed loops. The behaviour of executed loops can help users identify real performance bottlenecks and potential areas for optimizations.

According to a first aspect of the present invention there is provided a method for profiling performance behaviour of executed loops, comprising: for each invocation of a loop, incrementing a count of a measured event; and providing a display for a loop showing the number of measured events for each of the loop's invocations.

The measured event may be, for example, a number of loop iterations in a loop invocation or a number of cache misses in a loop invocation.

The code of a loop is preferably instrumented to obtain the count of the measured event. This instrumentation may be by replacing an entry point of a loop with a jump to a first wrapper code which allocates an array of counters to the loop invocation and increments a count of the invocation of the loop. The instrumentation may also redirect all branch instructions within the loop which jump to the entry point of the loop, to jump to a second wrapper code which increments the count of the measured event.

The display may be in the form of a graph of a loop invocation number against a number of measured events.

According to a second aspect of the present invention there is provided a computer program product stored on a computer readable storage medium for profiling performance behaviour of executed loops, comprising computer readable program code means for performing the steps of: for each invocation of a loop, incrementing a count of a measured event; and providing a display for a loop showing the number of measured events for each of the loop's invocations.

According to a third aspect of the present invention there is provided a system for profiling performance behaviour of executed loops, comprising: a first counter for the invocations of a loop; a second counter for the occurrences of a measured event for each invocation of the loop; and a display for a loop showing the number of measured events for each of the loop's invocations.

The system may include a code instrument for amending the code of a loop to obtain the counts of the measured event in each loop invocation.

According to a fourth aspect of the present invention there is provided a performance analysis tool for profiling performance behaviour of executed loops, comprising: an index for recording the invocation number of a loop; and an array of counters for each invocation of the loop for recording measured events in the invocation.

The invention provides a graphic display which enables users to obtain details about loops' behaviour based on profile information gathered on a representative workload.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
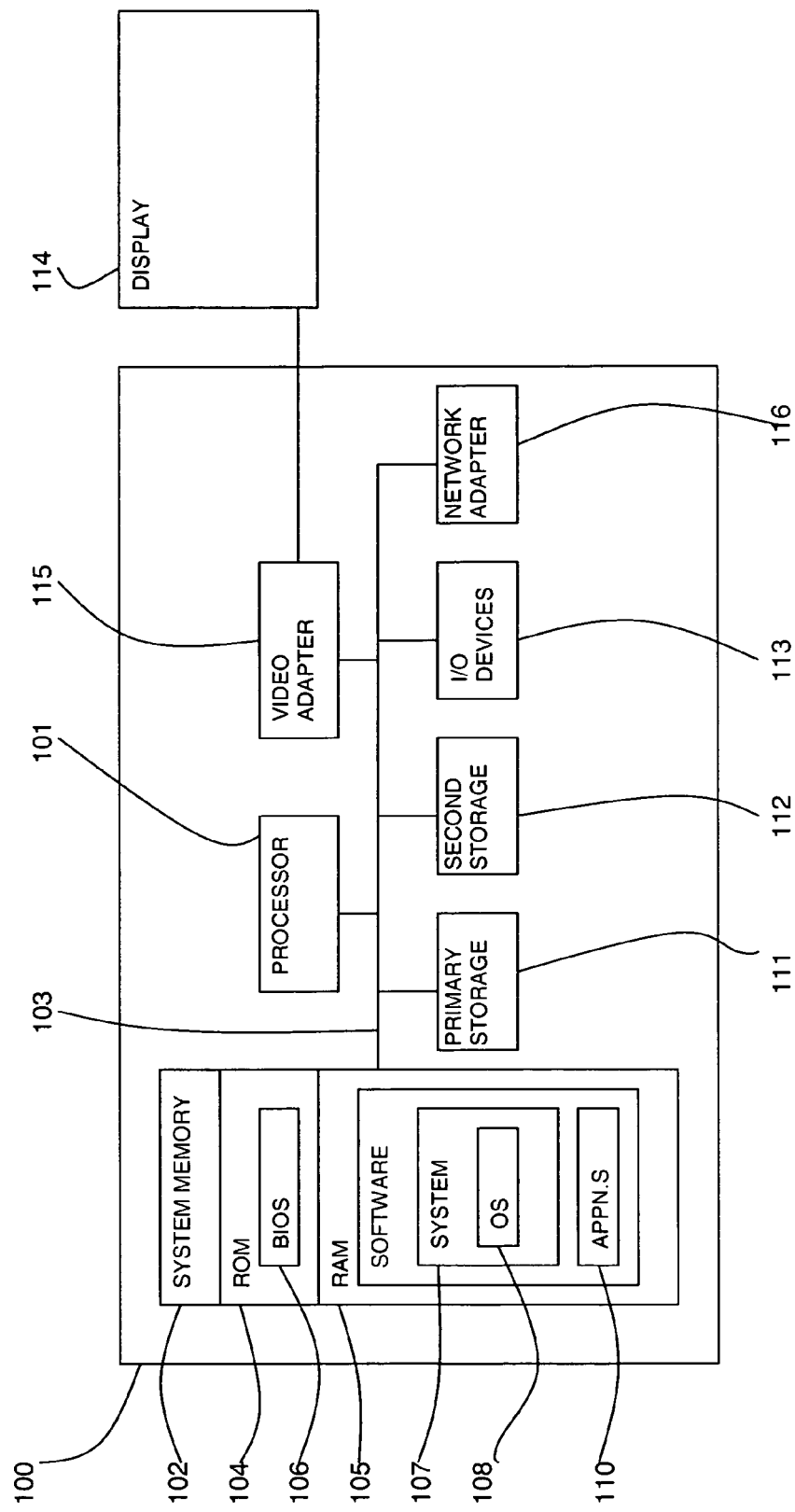
FIG. 1 is a block diagram of a computer system in which the present invention may be implemented.

Referring to FIG. 1, an exemplary system for implementing the invention includes a data processing system 100 suitable for storing and/or executing program code including at least one processor 101 coupled directly or indirectly to memory elements through a bus system 103. The memory elements can include local memory employed during actual execution of the program code, bulk storage, and cache memories which provide temporary storage of at least some program code in order to reduce the number of times code must be retrieved from bulk storage during execution.

The memory elements may include system memory 102 in the form of read only memory (ROM) 104 and random access memory (RAM) 105. A basic input/output system (BIOS) 106 may be stored in ROM 104. System software 107 may be stored in RAM 105 including operating system software 108. Software applications 110 may also be stored in RAM 105.

The system 100 may also include a primary storage means 111 such as a magnetic hard disk drive and secondary storage means 112 such as a magnetic disc drive and an optical disc drive. The drives and their associated computer-readable media provide non-volatile storage of computer-executable instructions, data structures, program modules and other data for the system 100. Software applications may be stored on the primary and secondary storage means 111, 112 as well as the system memory 102.

The computing system 100 may operate in a networked environment using logical connections to one or more remote computers via a network adapter 116.

Input/output devices 113 can be coupled to the system either directly or through intervening I/O controllers. A user may enter commands and information into the system 100 through input devices such as a keyboard, pointing device, or other input devices (for example, microphone, joy stick, game pad, satellite dish, scanner, or the like). Output devices may include speakers, printers, etc. A display device 114 is also connected to system bus 103 via an interface, such as video adapter 115.

A performance analysis tool is provided including a tool for profiling and visualizing the behaviour of executed loops.

A loop is a sequence of statements which is specified once but which may be carried out a plurality of times in succession. The code of the body of the loop is repeatedly carried out. The number of repeats of the loop may be specified in the code. Alternatively, the body of the loop may be repeated for each of a collection of items. In another alternative, the body of the loop may be repeated until some condition is met.

When code is executed and a loop is encountered, it is referred to as an invocation of the loop. In one invocation of the loop, the loop may repeat a number of times and each of these repeats is referred to as an iteration of the loop.

For each executed loop, the proposed method counts the number of times the loop was invoked and the number of measured events performed at each invocation. A measured event may be, for example, the number of iterations for each loop invocation, the number of cache misses, etc. The gathered profile information for each loop can then be presented in a graphic form, as a function of the number of executed events per number of loop invocations.

Figure 2:
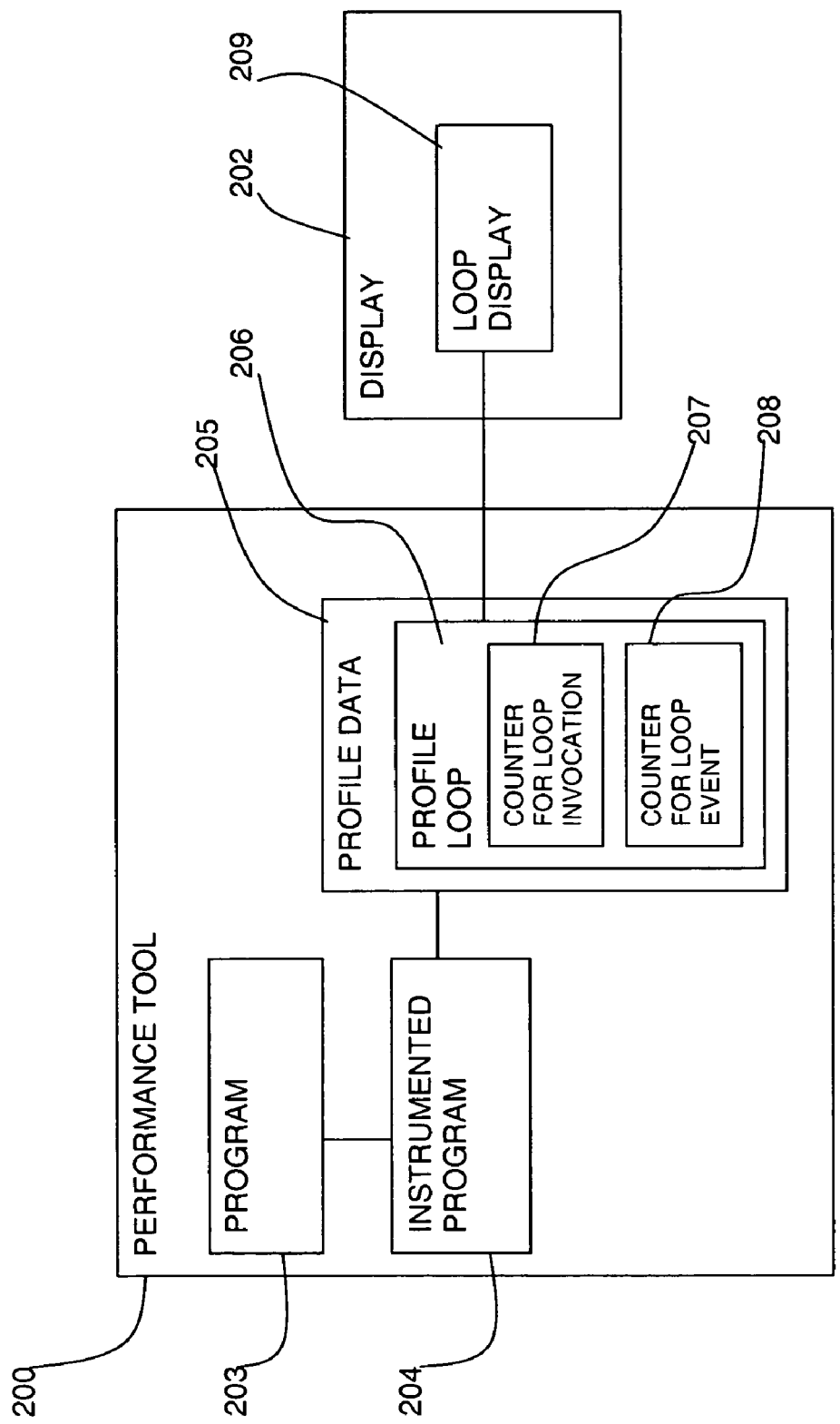
FIG. 2 is a block diagram of a performance analysis tool in accordance with the present invention.

Referring to FIG. 2, a performance analysis tool 200 is shown which is coupled to a display device 202.

The performance analysis tool 200 analyzes a program 203 by instrumenting the program 204 to record profile data relating to the running of the program 203. The program 203 may be, for example, a program source file, a binary executable file, an application program, a system program, a hardware driver, etc. The profile data 205 is recorded from running the instrumented program 204 on a representative workload.

The profiling of the data 205 includes profiling of data relating to executed loops 206 within the instrumented program 204. The profile data of executed loops 206 includes a count of loop invocations 207 and a count of measured events 208 within each invocation of the loop.

A graphic display 209 of the profile data of an executed loop 206 is provided on the display device 202. The graphic display 209 provides an image that is easily interpretable by a user of the performance analysis tool 200.

Figure 3:
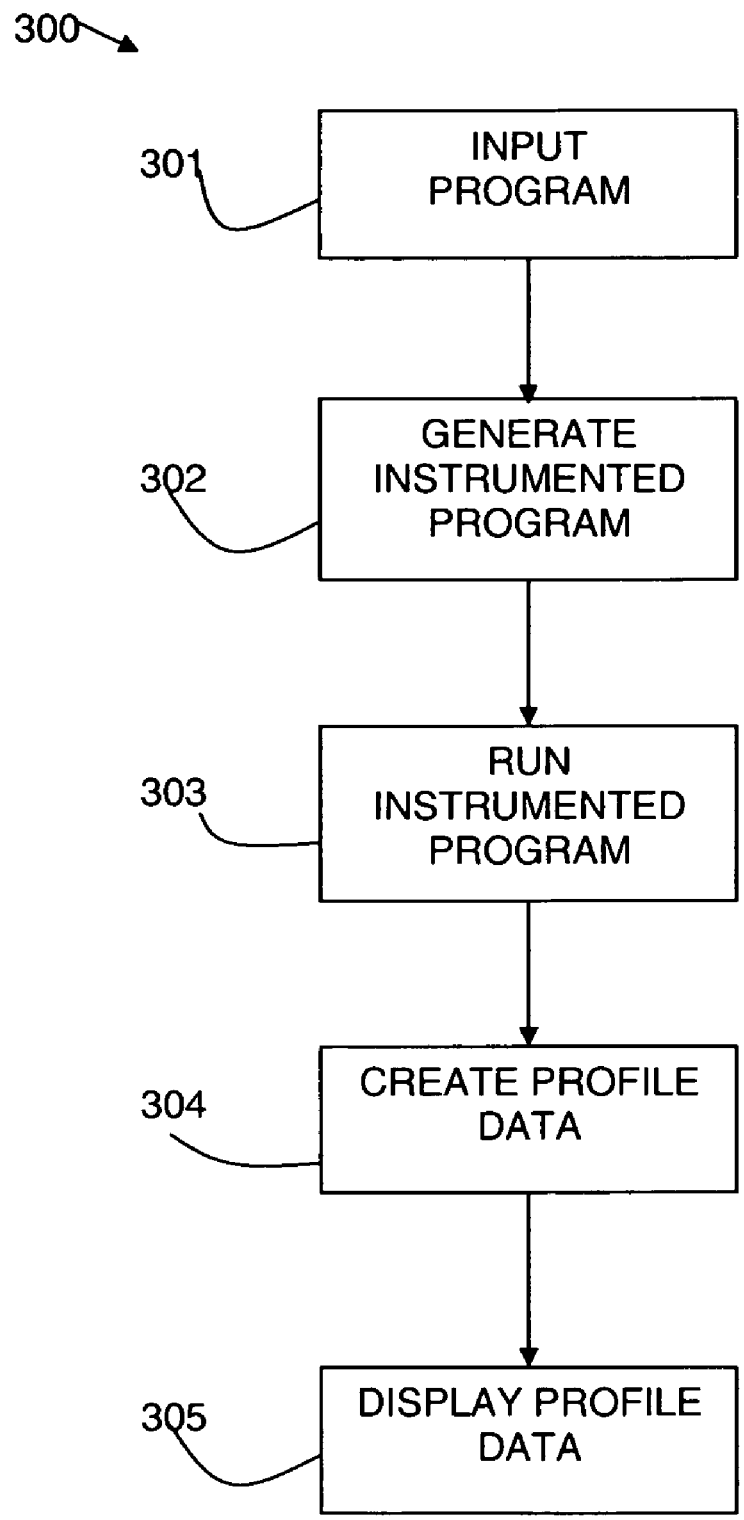
FIG. 3 is a flow diagram of a method of operation of the performance analysis tool in accordance with the present invention.

FIG. 3 shows a flow diagram of the overall method 300 of a performance analysis tool. A program is input into the performance analysis tool 301 and an instrumented program is generated 302. The instrumented program is run 303 and profile data is created 304. The profile data is displayed 305 to the user.

Figure 4:
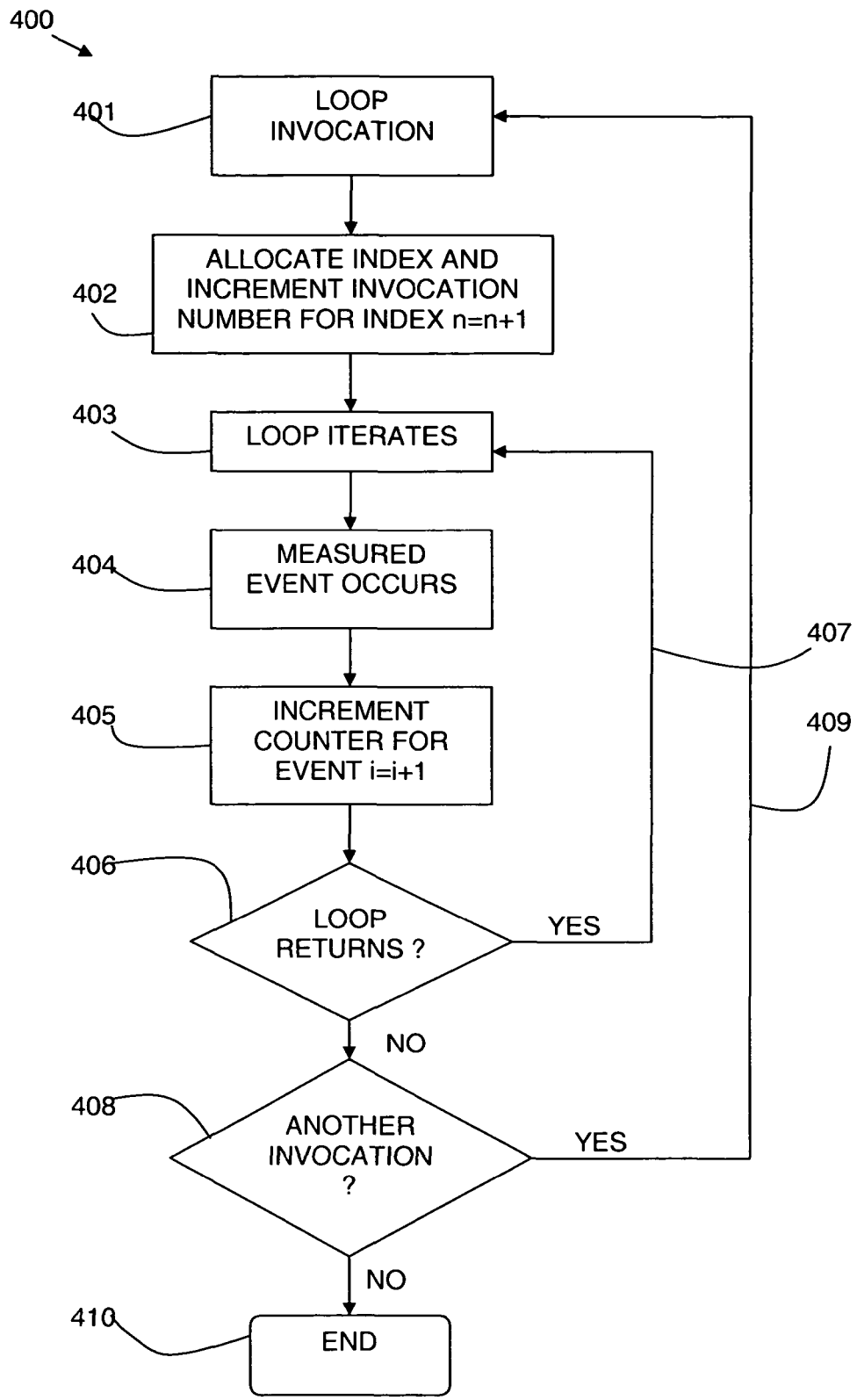
FIG. 4 is a flow diagram of a method of operation of analysis of an executed loop in accordance with the present invention.

FIG. 4 shows a flow diagram of a method 400 of profiling an executed loop in a program. At each invocation or calling upon of a loop 401, an index is allocated and an invocation number for the index is incremented 402. The loop iterates 403 and a measured event occurs 404 within the loop iteration. A counter of the measured event is incremented 405 corresponding to the invocation index number. It is then determined if the loop is repeated 406 and, if so, the method loops 407 to iterate the loop 403 and repeat the measured event 404.

If the loop is not repeated, it is then determined 408 if there is another invocation of the loop. If so, the method loops 409 to a new invocation 401 and the method is repeated with a new invocation index number for counting measured events in the new invocation. If not, the method ends 410.

An embodiment of the proposed method is now described in the form of a more detailed implementation of profiling executable loops in a program file.

As a first step, the program file is instrumented in order to collect profile information about a loop's behaviour. The instrumenting is carried out as follows:
1. Given a loop with an entry point labeled L in the program, replace L by a jump to a wrapper code labelled WrapInit.
2. Redirect all branch instructions within the loop which jump to L to jump to another wrapper code labelled by WrapL.

Point 1 above records the number of invocations of a loop. WrapInit includes instrumenting code in charge of allocating an array of counters and for incrementing a register (or an index) variable which corresponds to the invocation number of the loop:

if (first time invocation)
        allocate loopArray[ ]
    invokeIndex++

Point 2 above records the number of iterations of the loop which in this embodiment is the measured event. WrapL includes instrumenting code in charge of incrementing the appropriate item in the array in each loop iteration, as follows:

loopArray[invokeIndex]++

The instrumented program is then run in order to collect profile data.

Figure 5:
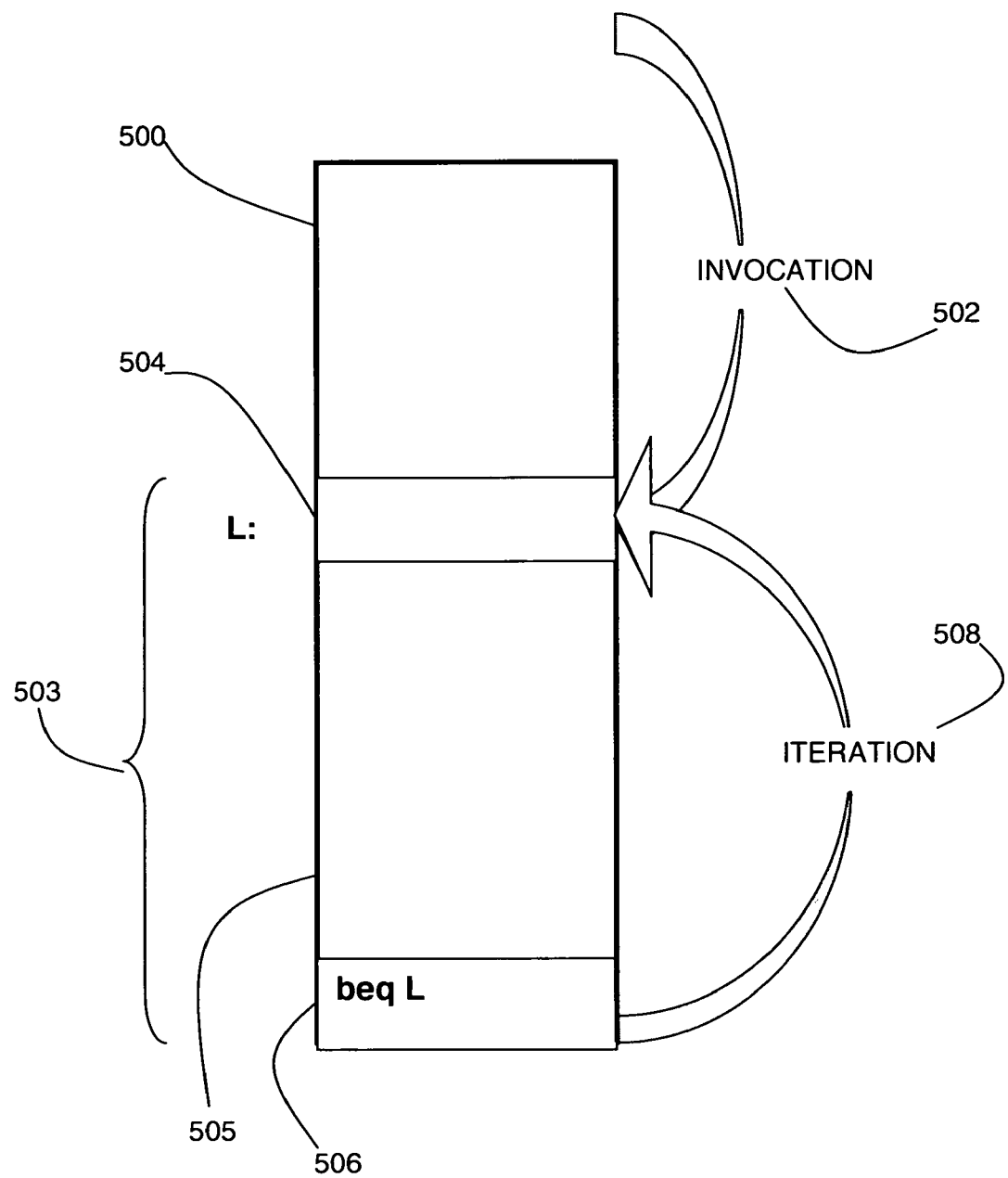
FIG. 5 is a schematic diagram of a program with a loop before instrumentation.

FIG. 5 shows a program 500 before instrumentation. The program 500 includes a loop 503. The loop is invoked 502 within the program 500.

The loop 503 has a body of code 505 including an entry point L 504 and an end point 506. The end point 506 jumps to the entry point L 504 on a specified condition of the end point 506. For example, the end point 506 specifies beq L (branch on equal L). The loop 503 is repeated by a number of iterations 508, until the end point 506 does not jump to the entry point L 504.

Figure 6:
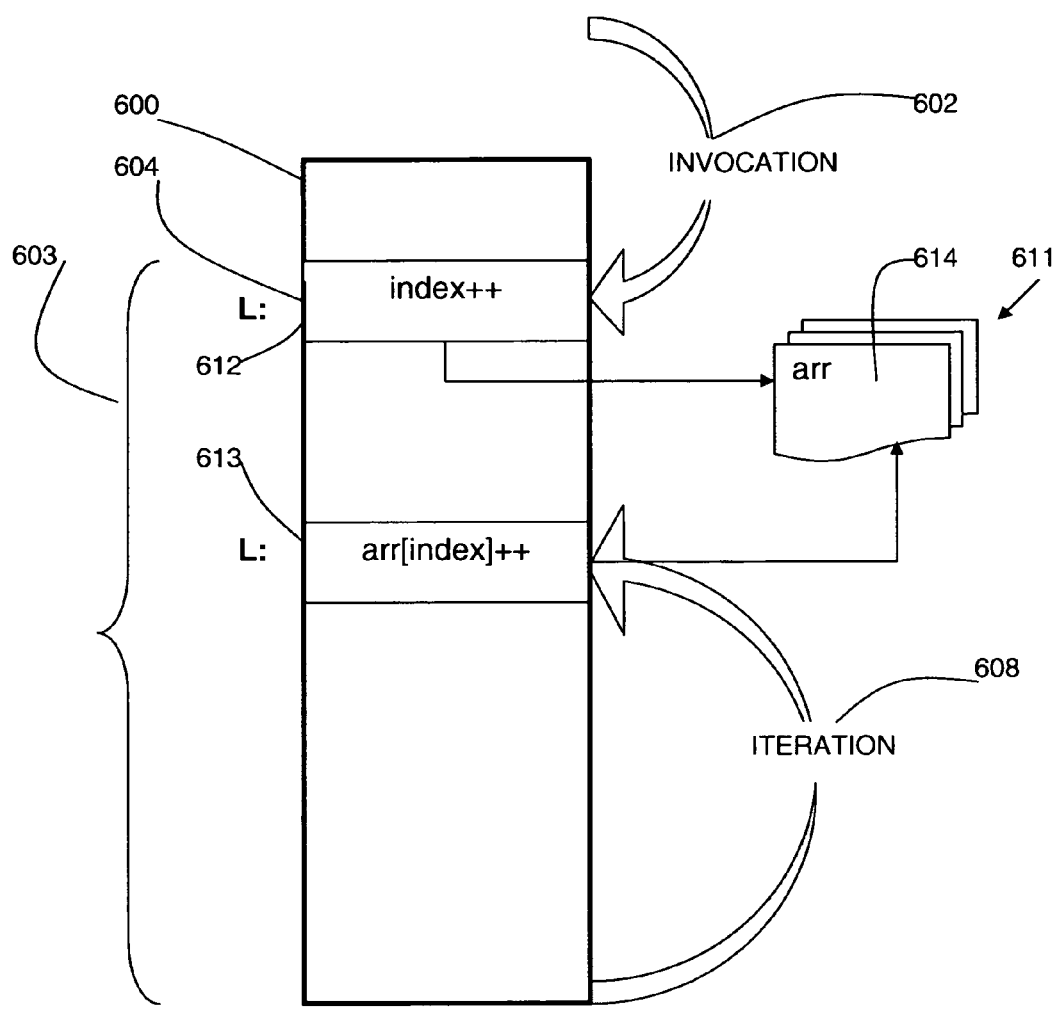
FIG. 6 is a schematic diagram of an instrumented program in accordance with the present invention.

FIG. 6 shows the program of FIG. 5 in a resultant instrumented version 600. Again, the program 600 includes a loop 603 which may be invoked 602 a number of times. The loop 603 has an entry point L 604.

At an invocation 602 of the loop 603, the entry point L 604 is replaced by a first wrapper code WrapInit 612 which allocates an index 611 for the invocation 602. The index 611 has an array of counters 614.

When a branch instruction within the body of the loop 603 instructs a jump to the entry point L 604 to repeat the loop 603, the branch instruction is directed 608 to a second wrapper code WrapL 613 which increments the appropriate counter in the array 614.

Different measured events in a loop 603 can be counted in an appropriate counter in the array 614, or by invoking other measurement utilities from within WrapInit and WrapL correspondingly.

At a subsequent invocation of the loop 603, an incremented index 611 is provided for recording the loop repeats or other measured events for this invocation.

A graphic display is prepared for each profiled loop. The proposed graphic display includes a regular plot display with X and Y axes. The X axis represents the invocation number of the loop, whereas the Y axis represents the measured event on each invocation of the loop, (e.g., number of iterations) on each invocation. Therefore, a plot located at (x,y) represents the measured event (e.g., number of iterations) y, that was performed by the loop when invoked on the x'th invocation of the loop during the program execution.

Figure 7:
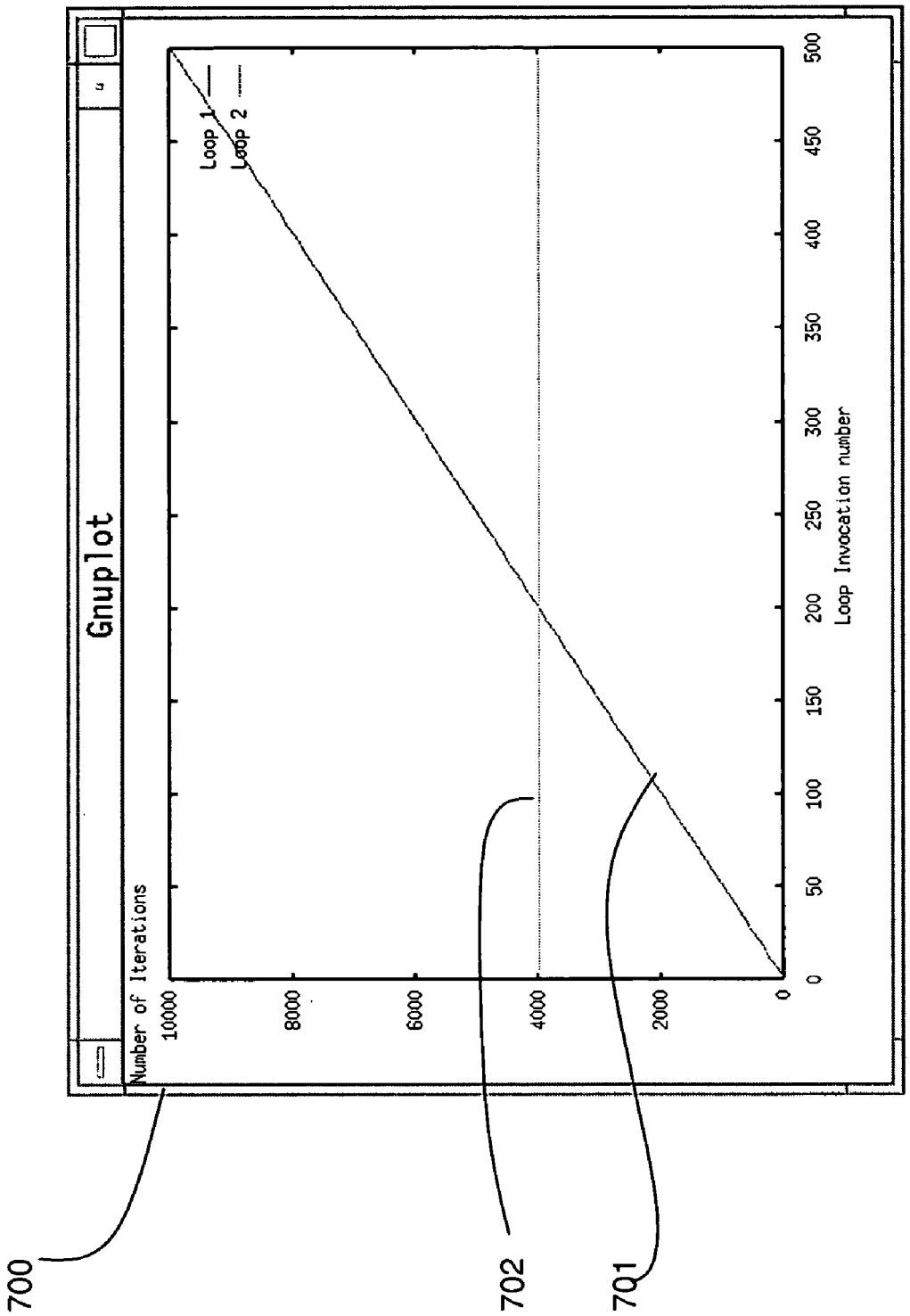
FIG. 7 is a display of loop performance in accordance with the present invention.

As an example, FIG. 7 shows a graph display 700 of two sample loops, Loop 1 701 and Loop 2 702.

According to the graph display 700, each time loop 1 701 is invoked during the program execution, it requires 20 times more iterations than the previous invocation. This indicates to the user that the loop needs to be improved, and that the information from previous invocations may be kept and re-used by future invocations of the loop. For example, if the loop searches through some data structure such as a linked list, it would make sense to keep a pointer to the last data element visited during the previous loop invocation and to start searching from there on, at the next loop's invocation.

Loop 2 702 shows that there are 4000 iterations that are being performed by the loop on each invocation. Again, this is an indication that there may be room to re-use results from previous invocations or to organise the data structures better to use more efficient look-up tables.

The method of profiling loops and the associated display can be embedded into existing performance analysis tools.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A computer-implemented method for profiling performance behaviour of executed loops, comprising the steps of:
    repeatedly invoking a loop during execution of program code by encountering statements in the code that may be iterated a plurality of times in succession and for each loop invocation;
    incrementing an invocation number to count the loop invocation;
    iterating the loop by repeatedly executing the statements in succession;
    while iterating the loop maintaining a count of loop iterations during the loop invocation and maintaining a count of occurrences of a measured event during the loop invocation;
    making a determination not to terminate the loop invocation; and
    producing a display wherein each invocation number is associated with the count of occurrences of the measured event, respectively, wherein any of the steps are implemented in either of computer hardware or computer software and embodied in a computer-readable medium.

2. A method as claimed in claim 1, wherein the measured event is the count of loop iterations during the loop invocation.

3. A method as claimed in claim 1, wherein the measured event is a number of cache misses in the loop invocation.

4. A method as claimed in claim 1, wherein code of the loop is instrumented to obtain the count of occurrences of the measured event during the loop invocation.

5. A method as claimed in claim 4, wherein the code of the loop is instrumented by replacing an entry point of the loop with a jump to a first wrapper code.

6. A method as claimed in claim 5, wherein the first wrapper code allocates an array of counters to the loop invocation and increments a counter holding the invocation number.

7. A computer software product for profiling performance behaviour of executed loops, including a computer-readable storage medium in which computer program instructions are stored, which instructions, when executed by a computer, cause the computer to perform the steps of:
- repeatedly invoking a loop during execution of program code by encountering statements in the code that may be iterated a plurality of times in succession and for each loop invocation;
- incrementing an invocation number to count the loop invocation;
- iterating the loop by repeatedly executing the statements in succession;
- while iterating the loop maintaining a count of loop iterations during the loop invocation and maintaining a count of occurrences of a measured event during the loop invocation;
- making a determination not to terminate the loop invocation; and
- producing a display wherein each invocation number is associated with the count of occurrences of the measured event, respectively.

8. A computer software product as claimed in claim 7, wherein the measured event is the count of loop iterations during the loop invocation.

9. A computer software product as claimed in claim 7, wherein the measured event is a number of cache misses in the loop invocation.

10. A computer software product as claimed in claim 7, wherein code of the loop is instrumented to obtain the count of occurrences of the measured event during the loop invocation.

11. A computer software product as claimed in claim 10, wherein the code of the loop is instrumented by replacing an entry point of the loop with a jump to a first wrapper code.

12. A computer software product as claimed in claim 11, wherein the first wrapper code allocates an array of counters to the loop invocation and increments a counter holding the invocation number.

13. A data processing system for profiling performance behaviour of executed loops, comprising:
- a processor;
- a memory accessible to the processor storing programs therein, the programs including a test program, wherein execution of the test program cause the processor to perform the steps of:
- repeatedly invoking a loop during execution of program code by encountering statements in the code that may be iterated a plurality of times in succession and for each loop invocation;
- incrementing an invocation number to count the loop invocation;
- iterating the loop by repeatedly executing the statements in succession;
- while iterating the loop maintaining a count of loop iterations during the loop invocation and maintaining a count of occurrences of a measured event during the loop invocation;
- making a determination not to terminate the loop invocation; and
- producing a display wherein each invocation number is associated with the count of occurrences of the measured event, respectively.

14. A data processing system as claimed in claim 13, wherein the measured event is the count of loop iterations during the loop invocation.

15. A data processing system as claimed in claim 13, wherein the measured event is a number of cache misses in the loop invocation.

16. A data processing system as claimed in claim 13, wherein the processor is operative for instrumenting the code of the loop to obtain the count of occurrences of the measured event during the loop invocation.

17. A data processing system as claimed in claim 16, wherein the code of the loop is instrumented by replacing an entry point of the loop with a jump to a first wrapper code.

18. A data processing system as claimed in claim 17, wherein the first wrapper code allocates an array of counters to the loop invocation and increments a counter holding the invocation number.

* * * * *